J. BRELL.
GARMENT FASTENER.
APPLICATION FILED JUNE 14, 1913.

1,103,651.

Patented July 14, 1914.

Witnesses:
C. H. Berthoff
John Murtagh

Inventor
Julius Brell
By his Attorneys

UNITED STATES PATENT OFFICE.

JULIUS BRELL, OF NEW YORK, N. Y.

GARMENT-FASTENER.

1,103,651.

Specification of Letters Patent. Patented July 14, 1914.

Application filed June 14, 1913. Serial No. 773,616.

*To all whom it may concern:*

Be it known that I, JULIUS BRELL, a citizen of the United States of America, residing in New York, in the borough of Manhattan, county and State of New York, have invented certain new and useful Improvements in Garment-Fasteners, of which the following is a specification.

This invention relates to the class of separable fasteners for garments comprising a stud member and a socket member and commonly known as snap buttons, and has reference especially to that species thereof in which spring catches are employed.

The object of this invention is to provide a separable stud and socket spring fastener in which the springs have sufficient hold on the stud to maintain connection under uneven lateral strain and in which the slots engaged by the springs are of such construction as to permit the ready release of the fastener by direct outward pull.

Figure 1:
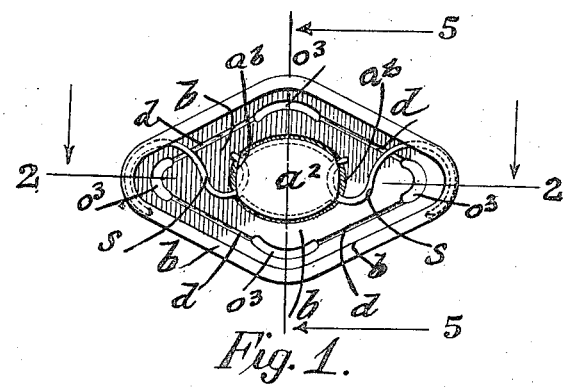
Figure 2:
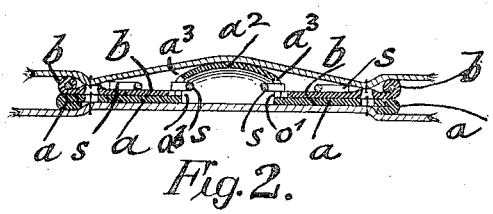
Figure 3:
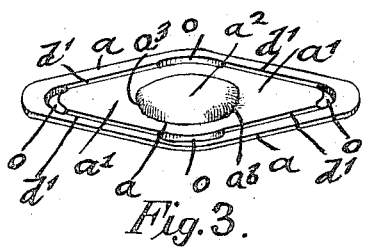
Figure 4:
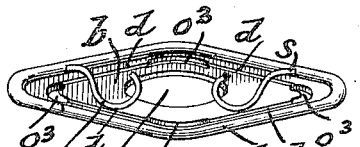
Figure 5:
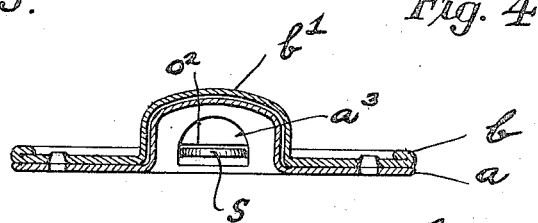

In the accompanying drawing, Figure 1 represents a plan-view of my improved garment-fastener, drawn on an enlarged scale, Fig. 2 is a vertical longitudinal section of the same, on line 2, 2, Fig. 1, Fig. 3 is a perspective view of the stud-member of the garment-fastener, and Fig. 4 is a perspective view of the socket-member of the same, Fig. 5 represents a vertical diametrical section of the two members of this fastener in engagement, the socket member being of that form which has a cap inclosing the stud of the stud member, such cap being omitted in the other figures.

Similar letters of reference indicate corresponding parts throughout the different figures of the drawing.

Referring to the drawing, $a$ represents the stud-member and $b$ the socket member of my improved garment-fastener of the "snap-button" class. The stud member $a$ is composed of a flat disk-shaped base-plate $a^1$ which is provided at four points with segmental openings $o$ for being sewed onto a garment, and with a stud $a^2$ that is made in cylindrical, oval or other shape, and in convex shape at its upper end. This stud is hollow and provided with slots $a^3$, at diametrically-opposite points, as shown clearly in Fig. 3. These slots are broad at their bottoms and arched at their tops as shown in Fig. 5. The oval shape of the stud $a^2$ serves for the purpose of forming an increased frictional connection with the opening of the socket member of the garment-fastener. The socket member $b$ consists of a stud $b^1$, (not shown in Figs. 1 to 4 as it may be left off), which corresponds in general shape with the shape of the stud $a^2$, and which is provided with an opening $o^2$, for engagement with the binding springs $s$, the inner ends of which serve to engage the recesses $a^3$ in the neck of the stud $a^2$, as shown clearly in Fig. 1. The binding-springs $s$ are made approximately of S-shape, the outer bends being made larger than the inner stud-engaging bends, so as to be firmly held in position by the crimped over edges of the socket portion, while the inner ends enter the slots $a^3$ of the stud $a^2$ and form a reliable interlocking connection therewith. A convex outer end of each spring projects through one of the arched slots $a^3$ in the hollow stud $a^2$ and the wire forming said spring crosses the wall of the stud twice at the base of said slot forming two points of contact, both springs thus furnishing four points of contact with the stud as shown in Fig. 1. When it is desired to release the fastener a direct outward pull causes the curved springs to slide up in contact with the edges of the slots $a^3$ and the arched form thereof forces said springs outward gradually and enables the members to be separated without manual manipulation of said springs. The oval or disk-shaped socket member $b$ is also provided with segmental openings $o^3$ by which the socket member is attached to the overlapping portion of the garment, as shown in Fig. 4. The segmental openings in the socket member $b$ as well as the segmental openings in the stud member are connected by narrow depressions $d$, $d^1$ respectively, in which the connecting portions of the fastening threads are placed, when the stud and socket members are stitched on to the underlapping and overlapping portions of the garment or other articles.

Owing to the exact fitting of the stud into the opening of the socket member or the stud thereof, and by the engagement of the same by the inner bends of the springs, a considerable friction is exerted on the stud, so that the release of the stud member from the socket member, and the separation of the stud and socket members when a one-sided pressure is exerted thereon is prevented. It requires a direct pressure on the socket member in upward direction on one side of the fastener for separating the two portions. The retention of the socket member on the stud member is furthermore secured by the engagement of the inner bends of the locking springs, by which a four-point connection, instead of a two-point connection between the parts is secured. By the increased interlocking connection of the springs of the socket member with the recessed shank of the stud member, a very reliable hold against side-pressure and accidental opening of the garment-fastener is obtained, while they can be easily separated from each other whenever required by exerting a uniform lifting pressure on the socket member. Furthermore, the arc-shaped opening $a^3$ serves an additional purpose in that it acts to gradually move the springs so as to compress them and thereby the movement of one part in respect to the other serves to gradually move the springs and from the recesses, whereby a very gradual, yet quick and efficient disengagement results.

I have shown one embodiment of my invention, but many changes may be made therein without departing from the spirit of the invention, as shown in the appended claim.

I claim:

A separable fastener comprising a stud member including an attaching plate and a hollow stud thereon provided with arched slots in its opposite sides, a socket member including an attaching plate having a socket adapted to be engaged by said stud, and springs on said socket member having arc-shaped inner ends adapted to project through said slots and hold said members firmly against separation by lateral strain, the arched tops of said slots serving to compress said springs and facilitate the separation of said members by direct outward pull.

In testimony, that I claim the foregoing as my invention, I have signed my name in presence of two subscribing witnesses.

JULIUS BRELL.

Witnesses:
PAUL GOEPEL,
JOHN MURTAGH.

---

Copies of this patent may be obtained for five cents each, by addressing the "Commissioner of Patents, Washington, D. C."